United States Patent
Odinak et al.

(10) Patent No.: US 7,703,086 B2
(45) Date of Patent: Apr. 20, 2010

(54) METHOD AND APPARATUS FOR SHARING DATA FILES AMONG RUNTIME ENVIRONMENT APPLETS IN AN INTEGRATED CIRCUIT CARD

(75) Inventors: Gilad Odinak, Bellevue, WA (US); David Milstein, Redmond, WA (US); Eric C. Perlin, Seattle, WA (US); Vinay Deo, Redmond, WA (US); Scott B. Guthery, Newton, MA (US)

(73) Assignee: Microsoft Corporation, Redmond, WA (US)

(*) Notice: Subject to any disclaimer, the term of this patent is extended or adjusted under 35 U.S.C. 154(b) by 1193 days.

(21) Appl. No.: 10/837,127

(22) Filed: Apr. 29, 2004

(65) Prior Publication Data

US 2004/0205714 A1   Oct. 14, 2004

Related U.S. Application Data

(62) Division of application No. 09/563,798, filed on May 2, 2000, now Pat. No. 6,845,498.

(60) Provisional application No. 60/133,600, filed on May 11, 1999.

(51) Int. Cl.
  *G06F 9/45* (2006.01)
(52) U.S. Cl. .................................................. 717/146
(58) Field of Classification Search .............. 717/1, 717/5, 14, 106, 178, 146; 713/187; 709/201; 719/331; 707/1, 103 R
  See application file for complete search history.

(56) References Cited

U.S. PATENT DOCUMENTS

| | | | |
|---|---|---|---|
| 4,888,773 A | | 12/1989 | Arlington et al. |
| 5,504,901 A | * | 4/1996 | Peterson ................. 717/144 |
| 5,615,331 A | | 3/1997 | Toorians et al. |
| 5,630,049 A | | 5/1997 | Cardoza et al. |
| 5,787,245 A | | 7/1998 | You et al. |
| 5,802,519 A | | 9/1998 | De Jong |
| 5,923,884 A | | 7/1999 | Peyret et al. |
| 5,966,702 A | * | 10/1999 | Fresko et al. ................. 707/1 |
| 6,005,942 A | * | 12/1999 | Chan et al. ................. 713/187 |
| 6,115,472 A | | 9/2000 | Shimizu et al. |
| 6,148,083 A | | 11/2000 | Fieres et al. |
| 6,173,419 B1 | | 1/2001 | Barnett |
| 6,195,774 B1 | | 2/2001 | Jacobson |

(Continued)

FOREIGN PATENT DOCUMENTS

EP    0 190 733    8/1986

(Continued)

OTHER PUBLICATIONS

Chan, Alvin T. S., Tse, Florine, Cao, Jiannong, and Leong, Hong Va, "Distributed Object Programming Environment for Smart Card Application Development," IEEE 2001, pp. 251-259.

(Continued)

*Primary Examiner*—Tuan Anh Vu

(57) ABSTRACT

An integrated circuit card includes a storage device to store one or more code files and one or more data files, and control logic. The control logic implements an ICC runtime environment that executes an applet in response to a command identifying both a code file and a data file received from a host system.

13 Claims, 9 Drawing Sheets

U.S. PATENT DOCUMENTS

| | | | |
|---|---|---|---|
| 6,296,191 B1 * | 10/2001 | Hamann et al. | 235/492 |
| 6,308,270 B1 | 10/2001 | Guthery | |
| 6,308,317 B1 * | 10/2001 | Wilkinson et al. | 717/139 |
| 6,430,570 B1 * | 8/2002 | Judge et al. | 707/103 R |
| 6,481,632 B2 | 11/2002 | Wentker et al. | |
| 6,490,720 B1 | 12/2002 | Carlsen et al. | |
| 6,493,823 B1 * | 12/2002 | Bourdin | 713/153 |
| 6,519,767 B1 * | 2/2003 | Carter et al. | 717/140 |
| 6,546,546 B1 | 4/2003 | Van Doorn | |
| 6,581,206 B2 | 6/2003 | Chen | |
| 6,845,498 B1 | 1/2005 | Odinak et al. | |
| 6,848,111 B1 * | 1/2005 | Schwabe et al. | 719/331 |
| 6,877,154 B2 * | 4/2005 | Nagashima et al. | 717/100 |
| 6,926,203 B1 | 8/2005 | Sehr | |
| 7,159,213 B2 * | 1/2007 | Tock | 717/166 |
| 7,182,250 B2 | 2/2007 | Kelly et al. | |
| 2004/0015853 A1 | 1/2004 | Prenn et al. | |

FOREIGN PATENT DOCUMENTS

| | | |
|---|---|---|
| EP | 0190733 | 8/1986 |
| EP | 0 292 248 | 11/1988 |
| EP | 0 356 237 | 2/1990 |
| EP | 0 949 595 A2 | 10/1999 |
| WO | WO 92/13322 | 8/1992 |
| WO | WO-9213322 | 8/1992 |
| WO | WO 98/09257 | 3/1998 |
| WO | WO-9809257 | 3/1998 |
| WO | WO 98/19237 | 5/1998 |
| WO | WO-9819237 | 5/1998 |
| WO | WO 98/25239 | 6/1998 |
| WO | WO 98/40818 | 9/1998 |
| WO | WO 98/43212 | 10/1998 |
| WO | WO-9843212 | 10/1998 |
| WO | WO 98/52160 | 11/1998 |
| WO | WO-9852160 | 11/1998 |

OTHER PUBLICATIONS

Kundert, Ken "Simulation methods for RF integrated circuits", *IEEE Computer Society*, Nov. 1997,752-765.

Hunzelmann, et al., "Design of Tool Interface for Integrated CAD-environments", *IEEE Computer society Press*, Nov. 1992, 558-563.

"Final Office Action", U.S. Appl. No. 10/837,441, (Feb. 2, 2009),13 pages.

Tucker, Allen "Programming Languages", *McGraw-Hill 1st edition*, (2002), pp. 24-25.

"Advisory Action", U.S. Appl. No. 10/837,441, May 11, 2009.

"Foreign Office Action", U.S. Appl. No. 00928967.9, (May 7, 2009),22 pages.

"Non-Final Office Action", U.S. Appl. No. 10/837,441, (Sep. 23, 2009),10 pages.

"Non-Final Office Action", U.S. Appl. No. 10/837,441, (Dec. 22, 2009),13 pages.

* cited by examiner

METHOD AND APPARATUS FOR SHARING DATA FILES AMONG RUNTIME ENVIRONMENT APPLETS IN AN INTEGRATED CIRCUIT CARD

RELATED APPLICATIONS

This application is a divisional of U.S. patent application Ser. No. 09/563,798 filed May 2, 2000, now U.S. Pat. No. 6,845,498 which claims the benefit of a related U.S. Provisional Application Ser. No. 60/133,600 filed May 11, 1999, entitled "TBD", to Odinak et al., which is incorporated by reference herein.

TECHNICAL FIELD

This invention generally relates to integrated circuit cards and, more specifically, to a method and apparatus for sharing data files among runtime environment applets in an integrated circuit card (ICC).

BACKGROUND

Today there is increasing use of integrated circuit cards, colloquially referred to as "smart cards", in place of, or in addition to, conventional magnetic stripe cards ("mag cards"). A smart card is a thin card embedded with a memory device (volatile and/or non-volatile) and associated programmable or non-programmable logic. Unlike the mag card that merely stores "static" information (e.g., a credit card account number), a smart card can add, delete and otherwise manipulate information stored on the card. Accordingly, smart cards are capable of storing and executing applications to carry out one or more functions within a smart card.

A smart card is often referred to as a "closed" system because, for security purposes, a smart card is purposefully designed to not expose its memory, intermediate system states or data and address bus information to external devices. To do so would render it susceptible to unauthorized access (hacking) and fraud. While its closed nature is useful for secure applications such as banking transactions, it makes it difficult to utilize prior art smart cards for development purposes. It is to be appreciated that application development often requires access to memory or bus values, or system state information during intermediate processing steps, access that has been specifically designed out of the smart card.

Another encumbrance to the smart card application designer is the limited resources of the smart card. That is, due to the physical and processing constraints placed on the smart card, prior art smart cards do not enjoy any dedicated debug facilities. Aside from the limited processing and memory attributes of a smart card, a smart card typically has but a single, bi-directional input/output (I/O) port. The communication bandwidth of this single I/O port is typically consumed to support execution of the smart card application itself, leaving little to no communication bandwidth to support debug features. Thus, application development using a smart card itself is virtually impossible. Consequently the development of applications for a smart card currently requires the use of an in-circuit emulator (ICE) and an associated, often proprietary software development application.

As a result of the limited processing and memory capability of the smart card, and the cost of development, each smart card is typically developed to support a few functions. The smart card functionality is typically embodied as a couple of stand-alone runtime environment applets, stored within a non-volatile memory of the smart card, and selectively invoked by a host system. To better illustrate this architecture, a block diagram of a typical prior art smart card system architecture is presented with reference to FIG. 1.

As shown, from a hardware perspective, smart card 100 is comprised of an input/output (I/O) interface 102, control logic 104, non-volatile memory 106 and volatile memory 108, coupled as shown. Control logic 104 supports an operating system with native functions 110 and a runtime environment (RTE) 112, which executes runtime environment applets 114A and 114B accessed from non-volatile memory 106. The operating system 110 and RTE 112 are typically invoked when the smart card is introduced to a host system, e.g., a card reader, which provides power to smart card 100.

Because of the limited memory and processing capability of the smart card, the runtime environment 112 is typically optimized for the functions it performs, i.e., to implement the functionality embedded within applets 114. Moreover, storage of the applets themselves are optimized, i.e., the bytecode and data for the applets are compiled and stored as a single executable entity within one or more segments of non-volatile memory, as shown.

It should be appreciated that while the prior art runtime environment and applets were optimized to preserve the processing and memory capabilities of the smart card, they do not provide a flexible environment for, say, smart card applet development. One of the drawbacks of the self-contained applets typical of the prior art is that in order to change the functionality of an applet, the data must be replaced as well. That is, the code and data of the applet are inextricably tied together.

In addition to limiting the flexibility of the applets, compiling the code and data into a common file may, in certain circumstances, waste memory resources. That is, if two applets require the same data, the prior art dictates that two applet files, each with the same data, be stored in the non-volatile memory of the smart card. By eliminating this needless duplication, memory resources may be freed to extend the functional capability of the smart card.

Thus, a method and apparatus for sharing data files among runtime environment applets is required, unencumbered by the limitations commonly associated with the prior art. One such solution is presented below.

SUMMARY

This invention concerns an integrated circuit card (ICC), such as a smart card and, more particularly, a method and apparatus for sharing data files among runtime environment applets in an integrated circuit card.

In accordance with a first aspect of the invention, an integrated circuit card is presented comprising a storage device having stored thereon one or more code files and one or more data files, and control logic. When the ICC is inserted into a card reader, the control logic implements an ICC runtime environment that executes an applet in response to a command identifying a code file and a data file received from a host system. It is to be appreciated that an ICC incorporating the teachings of the present invention stores and executes discrete code and data files, enabling runtime environment applets to share data files between discrete code files, according to one aspect of the invention.

The runtime environment applets, with discrete code and data files are developed using an innovative application development agent that includes a compiler and a file system builder. In addition to the typical function of translating source code into executable bytecodes, the compiler incorporating the teachings of the present invention distinguishes the executable bytecode from data, storing the executable bytecodes in a code file and the data in a data file.

The file system builder receives a description of a file system to be implemented on the ICC and generates a binary image of the file system. According to one embodiment of the invention, the received description is an ordered series of script commands that describe and build the file system. The binary image of the file system is then loaded (or masked) in the non-volatile memory of the ICC.

In this regard, the present invention also consists of an ICC file system, responsive to an innovative command set which enables a user (or host system program) to add, delete, modify and execute discrete code and data files stored in non-volatile memory of the ICC. It will be appreciated that the innovative ICC file system enables a user (or host system) to modify the functionality of an ICC (i.e., add, delete or modify code files) without disrupting the data files. Similarly, the ICC file system facilitates modification of ICC data stores without modification to an ICC functionality.

Thus, it is to be appreciated that an ICC application development system incorporating the innovative compiler and file system builder represents a significant advancement in smart card application development and deployment. By separating an applet into distinct code files and data files, the present invention facilitates a much more flexible runtime environment, while reducing the amount of memory required to store otherwise redundant information.

BRIEF DESCRIPTION OF THE DRAWINGS

Drawings

DETAILED DESCRIPTION

Example Network

Figure 1:
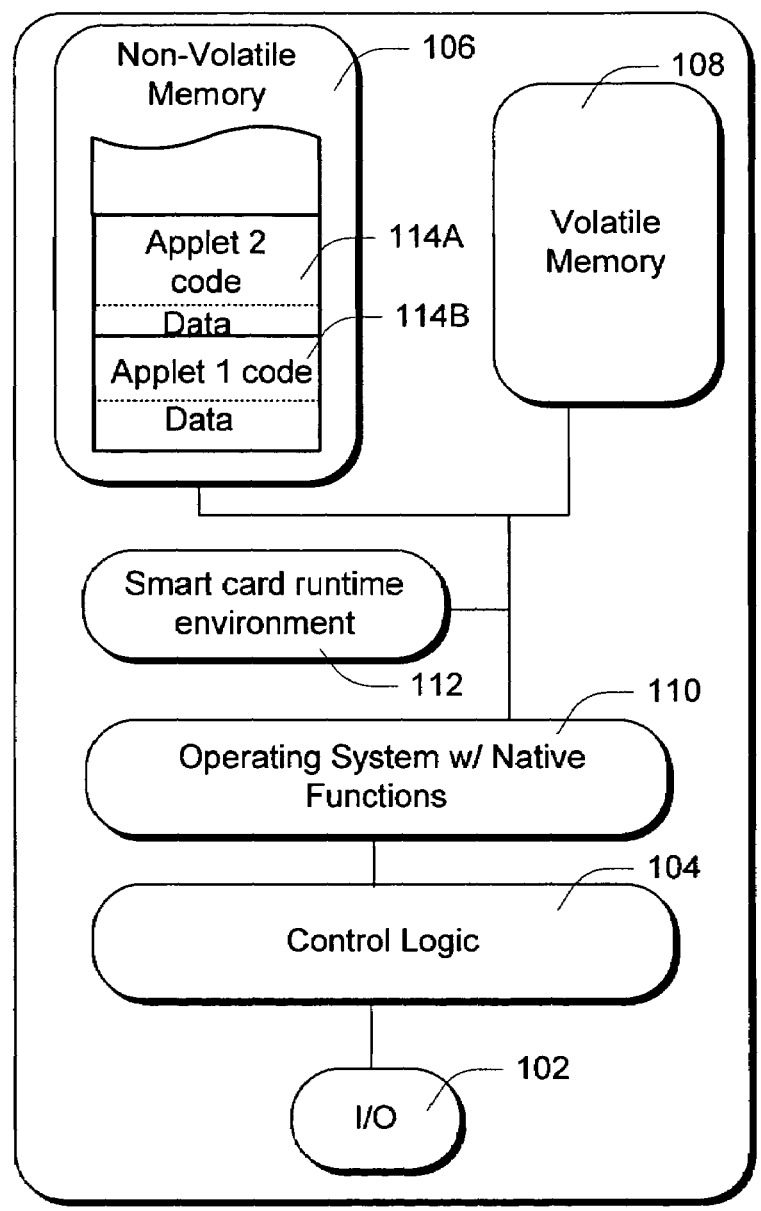
FIG. 1 is a block diagram of a system architecture for a prior art integrated circuit card.
Figure 2:
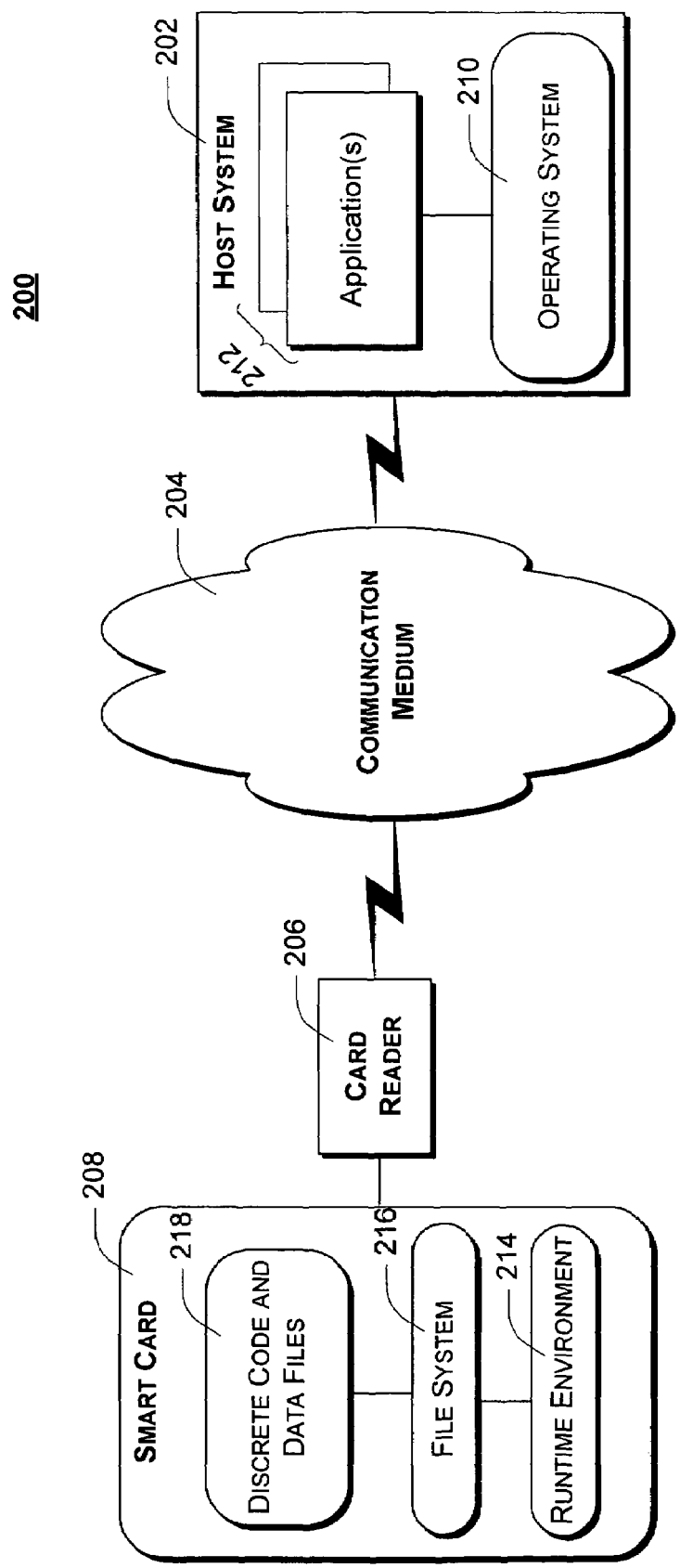
FIG. 2 is a block diagram of an example data network including an integrated circuit card incorporating the teachings of the present invention.

FIG. 2 illustrates an example data network 200 including an integrated circuit card 208 incorporating the teachings of the present invention. As shown, network 200 includes a host system 202 coupled to ICC 208 via communication medium 204 and card reader 206. Host system 202 includes an operating system 210 and one or more host applications 212. The innovative ICC 208 is shown comprising a runtime environment 214, a file system 216 and a storage medium having stored thereon one or more code files and one or more discrete data files (cumulatively referenced as 218). The communication medium 204 is intended to represent any of a number of typical communication links including, but not limited to, a proprietary data bus, an industry standard data bus, a local area network (LAN), a wide area network (WAN), or a global area network (e.g., the Internet).

According to the teachings of the present invention, a runtime environment applet is invoked on ICC 208 upon receipt of a command from an application 212 executing on a host system 202 which identifies at least one code file and one data file from the discrete code and data files 218. Unlike prior art smart card implementations wherein the bytecodes and data necessary to implement a runtime environment applet were saved as a single file and implemented by the runtime environment, innovative smart card 208 includes an innovative file system 216 which facilitates sharing of discrete code and data files. It will be appreciated, based on the description to follow, that the innovative file system facilitates modification to ICC functionality without the need to modify the data stored on the ICC.

Card reader 206 provides a necessary interface between ICC 208 and a computing system such as, e.g., host system 202. Card readers are typically designed to support any of a number of standardized communication protocols supported within the smart card community and, in this way, can typically accommodate smart cards adhering to any of the recognized communication standards from any smart card manufacturer. In this regard, card reader 206 is not chip- or card-specific. For purposes of this discussion, card reader 206 includes the necessary hardware and software resources required to support the interlaced debug protocol of the present invention. Consequently, card reader 206 is merely intended to be illustrative of card readers typically known within the art.

For ease of explanation, and not limitation, host system 202 is depicted within FIG. 2 as comprising a plurality of executable applications 212 and an operating system 210, as shown. According to one aspect of the present invention, to be described more fully below, host system 202 may well include an ICC application development agent as one or more of applications 212. The ICC development tool includes a compiler to translate a single source code file into a discrete code file and a data file for storage on ICC 208. In addition, the ICC development tool includes a file system builder, which takes a description of the code and data files to be provided on ICC 208, and generates a binary image of a file system which is loaded into the non-volatile memory of ICC 208 to build the file system. It is to be appreciated, then, that the innovative development agent described below facilitates the innovative features of ICC 208. When endowed with the innovative development agent, host system 202 may well be utilized in association with communication medium 204, card reader 206 and innovative ICC 208 as an application development system. Further reference to an application development system throughout this application is intended to reference data network 200.

Example Computer System

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices.

Figure 3:
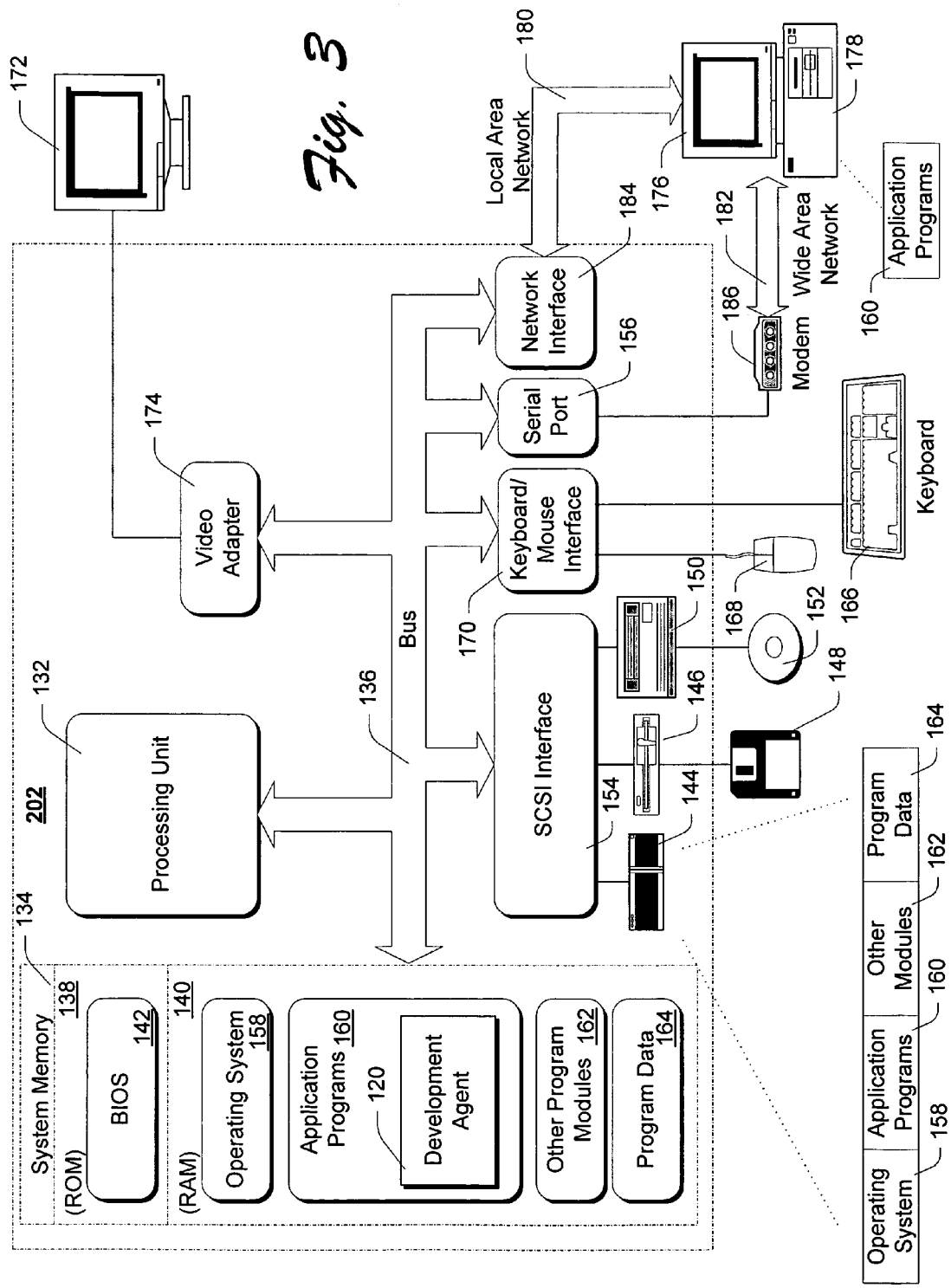
FIG. 3 is a block diagram of an example computer system including an innovative integrated circuit card application development agent, according to one aspect of the present invention.

FIG. 3 shows a general example of a host system 202 incorporating the teachings of one aspect of the present invention, and suitable for use within data network 200. It will be evident, from the discussion to follow, that host system 202 is intended to represent any of a class of general or special purpose computing platforms which, when endowed with the innovative application development agent, transforms data network 200 into an application development system. In this regard, the following description of host system 202 is intended to be merely illustrative, as computer systems of greater or lesser capability may well be substituted without deviating from the spirit and scope of the present invention.

As shown, host system 202 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within host system 202, such as during start-up, is stored in ROM 138.

Host system 202 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for host system 202.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative application development agent 120, other program modules 162, and program data 164. A user may enter commands and information into host system 202 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, host system 202 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to host system 202, although only a memory storage device 178 has been illustrated in FIG. 3.

As shown, the logical connections depicted in FIG. 3 include a local area network (LAN) 180 and a wide area network (WAN) 182. Such networking environments are commonplace in offices, enterprise-wide computer networks, intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, host system 202 is connected to the local network 180 through a network interface or adapter 184. When used in a WAN networking environment, host system 202 typically includes a modem 186 or other means for establishing communications over the wide area network 182, such as the Internet. The modem 186, which may be internal or external, is connected to the bus 136 via a serial port interface 156. In a networked environment, program modules depicted relative to the personal host system 202, or portions thereof, may be stored in the remote memory storage device. It will be appreciated that the network connections shown are exemplary and other means of establishing a communications link between the computers may be used.

Generally, the data processors of host system 202 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 4:
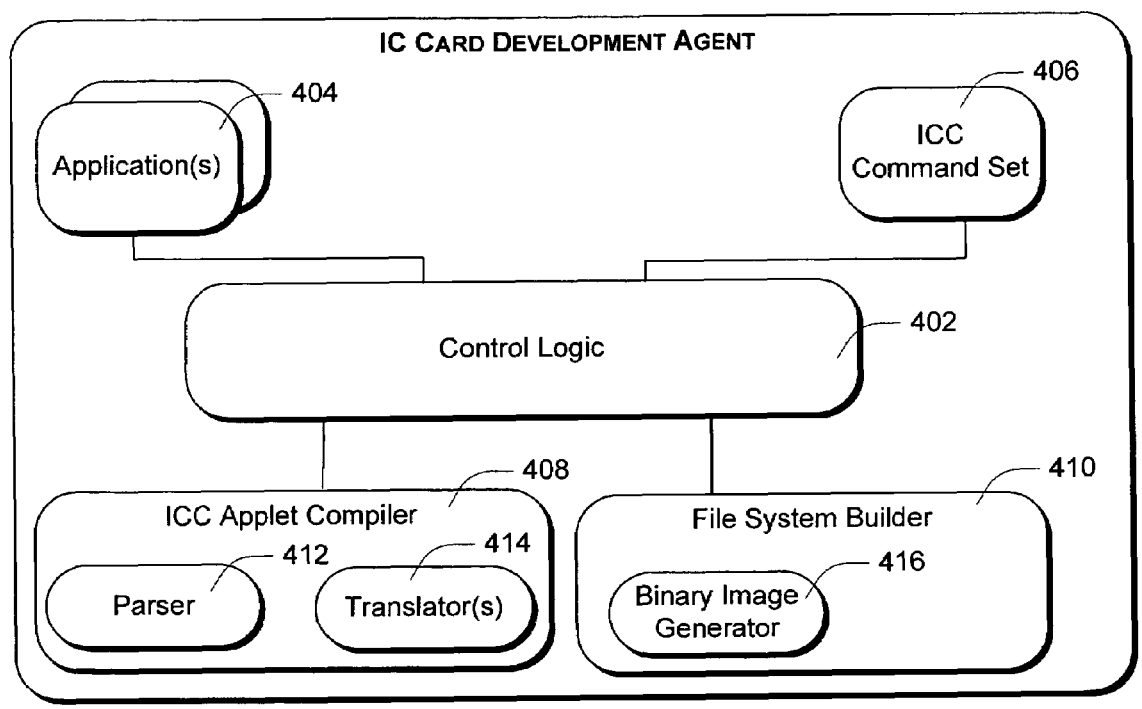
FIG. 4 is a block diagram of an example development agent, in accordance with the teachings of the present invention.

FIG. 4 illustrates a block diagram of an example ICC development agent 120, suitable for use in host system 202. As shown, development agent 120 comprises control logic 402, one or more development application(s) (or tools) 404, an ICC command set 406, an ICC compiler 408 and a file system builder 410, coupled as depicted.

Control logic 402 is intended to represent any of a broad range of logic known in the art. In one implementation, control logic 402 is a processor, while in alternate embodiments control logic is a microcontroller, a programmable logic array, or a series of executable instructions which perform logic functions. Control logic 402 communicates with ICC 208 in any of a plurality of standard communication protocols. In alternate embodiments, non-standard protocols may well be used to communicate between controller 402 and ICC 208 such as, for example, a unique development communication protocol. Although not specifically denoted, it is to be appreciated that controller 402 communicates with ICC 208, and any other peripheral for that matter, via the communication resources of operating system 210 of host system 202. Insofar as such resources are well known in the art, they need not be described further here.

According to the illustrated example embodiment, development agent 120 is depicted as including one or more development application(s) or tools 404. These tools may well be any of a number of application development tools commonly known in the art. That is, application development agent 120 may well be utilized with any of a number of development applications such as, for example, Visual Basic or Visual C/C++ application development tools available from Microsoft Corporation of Redmond, Wash. Moreover, such applications 404 need not be integrated with development agent 120. Rather, agent 120 may well receive source code developed using an external application development tool without deviating from the spirit and scope of the present invention. It is to be appreciated that by using common software development tools such as those described above, it is to be appreciated that the innovative smart card application development system 200 does not require the chip-specific, often proprietary software development application and associated compilers, linkers and debuggers that are typical of the prior art ICC application development systems.

According to one aspect of the present invention, development agent 120 includes an innovative ICC applet compiler 408. As shown, the ICC applet compiler 408 is comprised of a parser 412 and one or more translator(s) 414. The translators 414 take source code developed using, for example, one of development applications 404, and translates it into a lower-level, executable form, e.g., runtime environment bytecodes or assembly language instructions. It is common to employ two or more translator(s) in a compiler, one as a front-end compiler to receive and translate the source code to an intermediate level language, and a back-end translator to translate the intermediate level code into an executable form acceptable to the processor which will ultimately execute the applet. The use of translator(s) in compilers is well-known and, as a result, need not be further described here.

In addition to translator(s) 414, ICC compiler 408 includes a parser 412. As used herein, the parser 412 analyzes the received code, in either source code, intermediate level, or executable form and separates the executable instructions from the data. More specifically, in accordance with the teachings of the present invention, parser 412 separates the code from the data and saves each in a separate and independent file. It is to be appreciated that a runtime environment applet created by the innovative ICC applet compiler 408 consists of at least two files, one code file and one data file.

In addition to the innovative compiler 408, development agent 120 includes a file system builder 410. As shown, file system builder 410 includes binary image generator 416. As alluded to above, binary image generator 416 receives a description of a file system and generates a binary image of the file system description. The file system description is an ordered series of commands that describe and build the file system. An example subset of the commands used to create a file system description are provided below, in Table I.

TABLE I

Example File System Description Syntax and Definitions

| | |
|---|---|
| Partition_size n: | Sets the size of the file system partition to n bytes. |
| Num_FCB n: | Sets the number of file control blocks created in file system to n. |
| Num_ACL n: | Sets the number of access control lists in the created file system to n. |
| Sector_size: | sets the sector size of the file system in bytes. This is the number of bytes that are added to a file each time it needs more space. The larger n is, the more unused space there may be in files but the more quickly you can access them and the less overhead space they require. The smaller n is, the more tightly the data in the file fits the allocated space, but there is more overhead in managing the file. |
| Target [x86/8051/AVR]: | Sets the target to accommodate either the "x86", "8051" or "AVR" processing environments. |
| Create_Partition: | creates a partition within the file system and populates it with a default file and a default access control level. |
| FILE filename ACL Aclfilename: | creates a file with the given file name whose access control rules are in the file with the given ACL file name. |

TABLE I-continued

Example File System Description Syntax and Definitions

| | |
|---|---|
| DELETE filename (or directory): | deletes a named file or directory. |
| KP_Data {GroupUids} Protocol {ProtocolData}: | Put data that describes a known principal into the current file which must be a file in /s/k |
| ACL_Data ResourceOperationIndex ExpresionType {BooleanExpression}: | Add the given access control rule to the current file. |
| Numeric_Data i1 i2 i3 . . . in | |
| Numeric_Data_At Position = i1 i2 i3 . . . in: | this pair of commands enter numeric data into the current file. The first version enters the data at the current position in the file and the second version sets the current position before beginning entry. |
| ASCII_Data CharacterString | |
| ASCII_Data_At Position = CharacterString: | this pair of commands enter ASCII encoded data into current file. The first version enters the data at the current position, while the second version sets the current position before beginning entry at the current position. |
| Unicode_Data Characterstring | |
| Unicode_Data_At Characterstring: | this pair of commands enter UNICODE encoded alphanumeric data into the current file. The first version enters the data at the current position, while the second version sets the current position before beginning entry. |
| Set_File_ACL FileName AclFileName: | sets the access control level of the file by the given filename. |
| Set_File_Size Filename n: | sets the size of the file by the given filename to the given value in bytes. |
| END: | terminates reading of the file system description commands by the file system builder and invokes the binary image generator to output a binary image of the file system. |

It should be noted that although reference is made to "filenames" in the above syntax, this is for ease of explanation only, as other indicators of a file may well be used. Examples of suitable file descriptors include, without limitation, file names, file handles, and the like.

According to one implementation, the file system description is supplied to file system builder 410 by control logic 402, and includes a list of code files and data files required to provide an ICC with certain functionality. In on embodiment, ICC development agent 120 provides a graphical user interface (not shown) to a user with a list of available code and data files, enabling the user to dynamically create a file system description in a high-level, graphical representation. Based on the description received from the user, control logic 402 accesses ICC file system command set 406 which includes, at least, the file system syntax identified in Table I to generate the file system description.

In an alternate embodiment, one or more applications 404 provide control logic 402 with the file system description based on functionality requirements or the input of a developer using a higher-level language.

Once the file system description is received, file system builder 410 invokes the binary image generator 416 to generate a binary image of the received file system description. According to one implementation, the binary image generated from the received file system description is downloaded to non-volatile memory (e.g., EEPROM) of an innovative IC card 208. In an alternate embodiment, the binary image is provided to a mass-producer of IC cards, which burns (or masks) the image on a read-only memory (ROM) device for the IC card. In either case, file system builder 410 provides an IC card (208) with the ability to uniquely access (add, delete, modify) and execute code files and data files independently to implement a flexible, array of runtime environment applets.

As alluded to above, ICC file system command set 406 is a library of functional commands which control logic 402 utilizes to create and/or communicate with the file system 216 of an IC card incorporating the teachings of the present invention. More specifically, the ICC file system command set 406 provides control logic 402 with the vocabulary required to create, delete, access and execute the discrete code and data files 218 of ICC 208. Although ICC file system command set 406 is depicted as a separate functional block, this is for ease of illustration and explanation. It will be appreciated that ICC file system command set 406 may well be integrated with other functional elements such as, for example, control logic 402 without deviating from the spirit and scope of the present invention.

According to one implementation, control logic 402 communicates with file system 216 using the innovative file system command set in accordance with a standard communication protocol such as, for example, International Standards Organization (ISO) 7816 T=0, or T=1.

Although depicted as a separate functional elements, those skilled in the art will appreciate that compiler 408 and/or file system builder 410 may well be integrated within control logic 402. Accordingly, the teachings of the present invention may well be practiced with variation from the exemplary embodiment without deviating from the spirit and scope of the present invention.

Example Integrated Circuit Card

Figure 5:
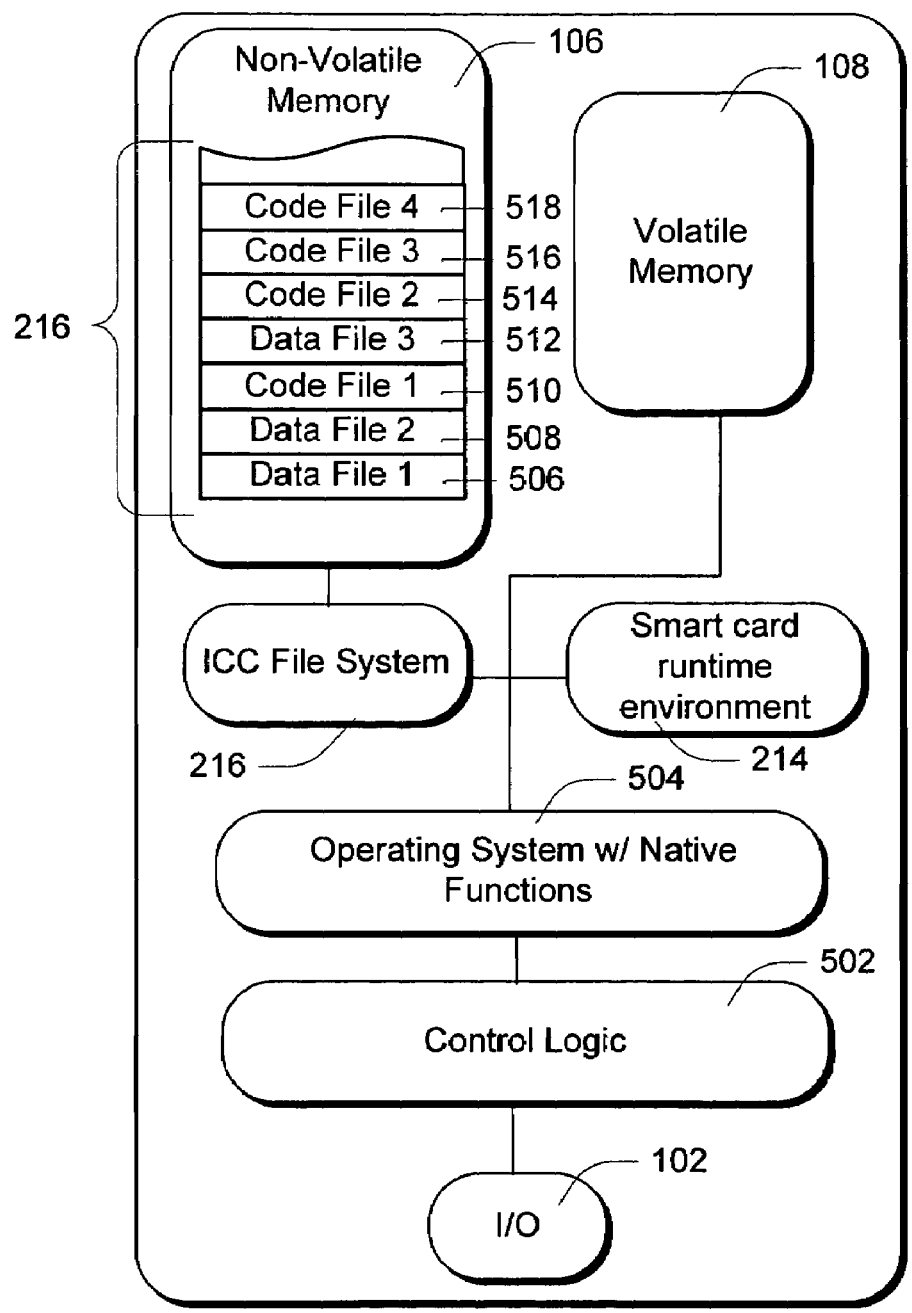
FIG. 5 is a block diagram of an example integrated circuit card including a file system and discrete code files and data files, according to the teachings of the present invention.

FIG. 5 illustrates a block diagram of an innovative integrated circuit card 208 incorporating the teachings of the present invention in greater detail. As shown, IC card 208 includes the I/O port 102, runtime environment 214, nonvolatile and volatile memory (106 and 108) of prior art IC cards. In addition, ICC 208 includes control logic 502, operating system with native functions 504, each modified to accommodate the innovative ICC file system 216 and a plurality of discrete code files and data files 506-518.

As used herein, control logic 502 is intended to represent any of a number control means known in the art, such as those described in association with control logic 104. However, such control logic is modified, as necessary, to recognize and implement instructions from the innovative file system command set. In this regard, control logic 502 enables a host system to access or execute discrete code and data files 506-518 via the operating system 504 and the ICC file system 216. Similarly, operating system 504 is modified only to the extent necessary to accommodate ICC file system 216 and the discrete code and data files 506-518. An example of a suitable file system is the Smart Card for Windows operating system commonly available from Microsoft Corporation, of Redmond, Wash.

As introduced above, to implement a runtime applet in ICC 208, control logic 502 receives an Execute command from a host denoting a code file and a data file. According to one embodiment of the present invention, the received command is in the form of an application protocol data unit (APDU). An example APDU is graphically illustrated with brief reference to FIG. 6.

Figure 6:
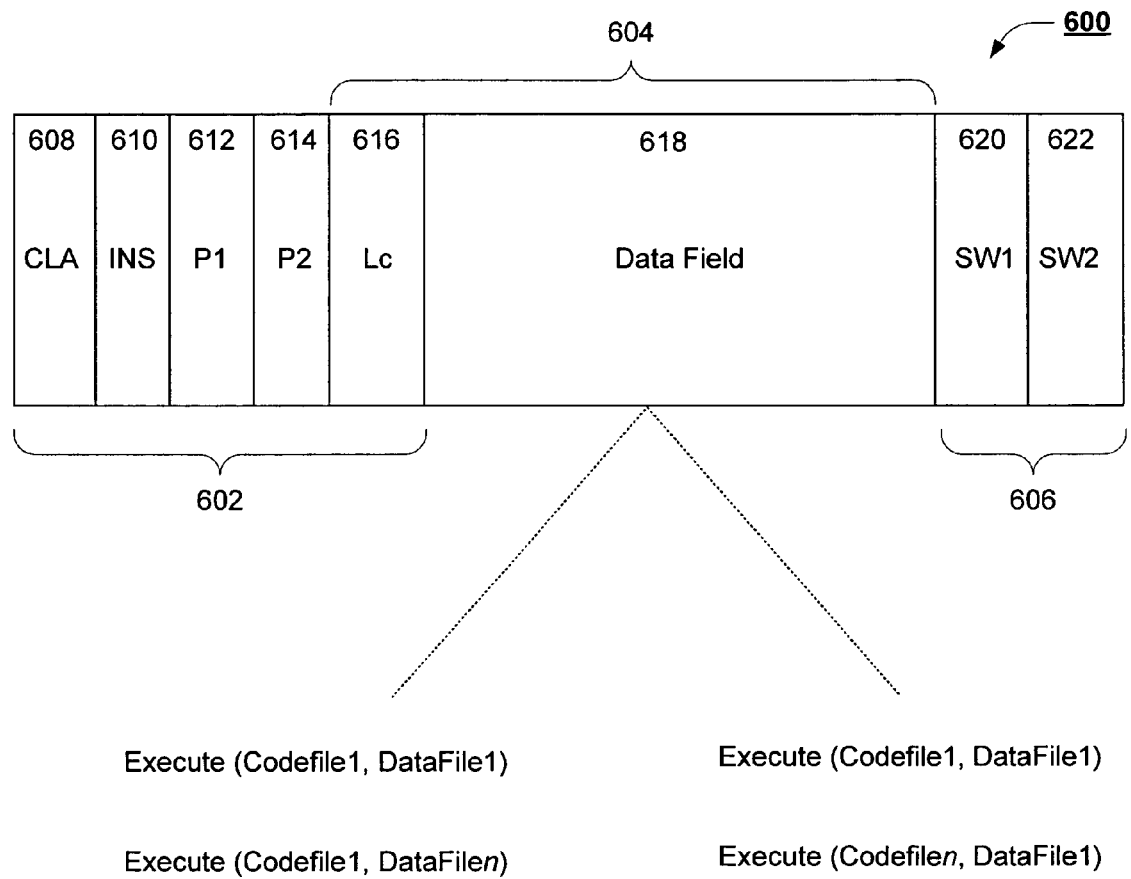
FIG. 6 is a block diagram of an example application protocol data unit (APDU) suitable for use in accordance with the present invention.

As shown, FIG. 6 graphically illustrates an application protocol data unit suitable for use in accordance with the present invention, to communicate file system command set instructions between a host system 202 and an innovative ICC 208, according to one embodiment of the present invention. As shown, APDU 600 is comprised of a mandatory header 602, a conditional body 604, and a mandatory trailer 606. The mandatory header includes a class byte 608, instruction byte 610, and parameter bytes 612 and 614. The conditional body includes a length field 616, which denotes the number of bytes in the data field, and the number of bytes expected in any response. The data field 618 includes the data, if any, transmitted in the APDU. The mandatory trailer field 606 is comprised of status bytes 620 and 622, respectively.

According to the teachings of the present invention, a host system 202 implements a runtime environment applet within ICC 208 by issuing an EXECUTE command of the form: Execute (code_filename, data_filename). As shown, a runtime environment applet executed in accordance with the teachings of the present invention requires both a code filename and a data filename. As shown in FIG. 6, the present invention provides for different combinations of code and data files, thereby enabling a code file to share data files, and for a code file to use multiple data files, without the need to integrate the content of the data file into a single applet file.

Example Operation

Figure 7:
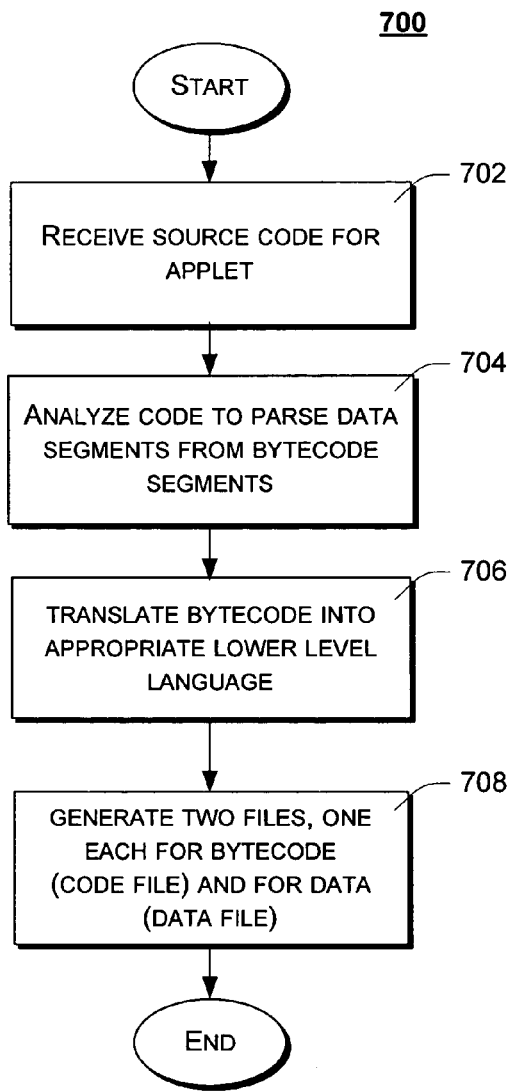
FIG. 7 is a flow chart for compiling a runtime environment applet, in accordance with the teachings of the present invention.

FIG. 7 is a flow chart of an example method for compiling a runtime environment applet using a development agent incorporating the teachings of the present invention, according to one aspect of the present invention. For ease of explanation, and not limitation, the method of FIG. 7 will be developed with continued reference to FIGS. 1-6.

Turning to FIG. 7, the method begins with step 702, wherein the innovative ICC applet compiler 408 receives the source code to be compiled. More specifically, a development application (e.g., 404) provides control logic 402 of development agent 120 with a file containing source code in a high-level programming language, which must be compiled to an executable form for use in an IC card, e.g., ICC 208.

According to one implementation, ICC applet compiler 408 analyzes the received source code to parse data segments from bytecode segments, step 704. As described above, parser 412 receives the source code, identifies data objects within the source code, and separates the data objects from the executable bytecodes. Each data object is assigned a relative location in the data file. A reference to this relative location is inserted to the code file that is being generated. In the second pass of the compiler, it decides on the absolute addresses of each data object and generates the data file accordingly. At the same time, it replaces all the data object references in the code file with actual addresses.

In step 706, the bytecode and data objects are passed to the translator(s), as they are translated into an executable form. More specifically, the bytecode and data objects of the applet are translated into a form suitable for execution by the control logic 502 of the IC card 208. In this regard, compiler 408 is chip-specific although it is anticipated that translator(s) 414 for control logic suitable for IC card applications may well be provided within compiler 408.

Although the illustrated example embodiment invokes the parsing step 704 before the translation step 706, those skilled in the art will appreciate that there may be advantages to reversing this order. That is, it may be more convenient to first translate the received source code to some intermediate-level compiler language. One common language is the static single assignment (SSA) form, which has the inherent property that reoccurring variables (i.e., local variables within a method) are uniquely identified within the SSA form. Accordingly, it may prove computationally easier to translate the received source code to an intermediate-level language, parse the code from the data, and then perform a back-end translation down to executable form. In another embodiment, the entire translation step(s) may be completed, wherein the code is parsed from the data while in executable form. Regardless, all such variations are anticipated within the scope and spirit of the present invention.

In step 708, ICC applet compiler 408 generates two files from the received source code, one each for the bytecode (i.e., the code file) and for data (i.e., the data file). More specifically, once the parsing and translation steps have been completed, the executable code is saved in a discrete code file, while the data is saved in a discrete data file. In this way, data files may be shared across code files providing for more flexible implementations.

Figure 8:
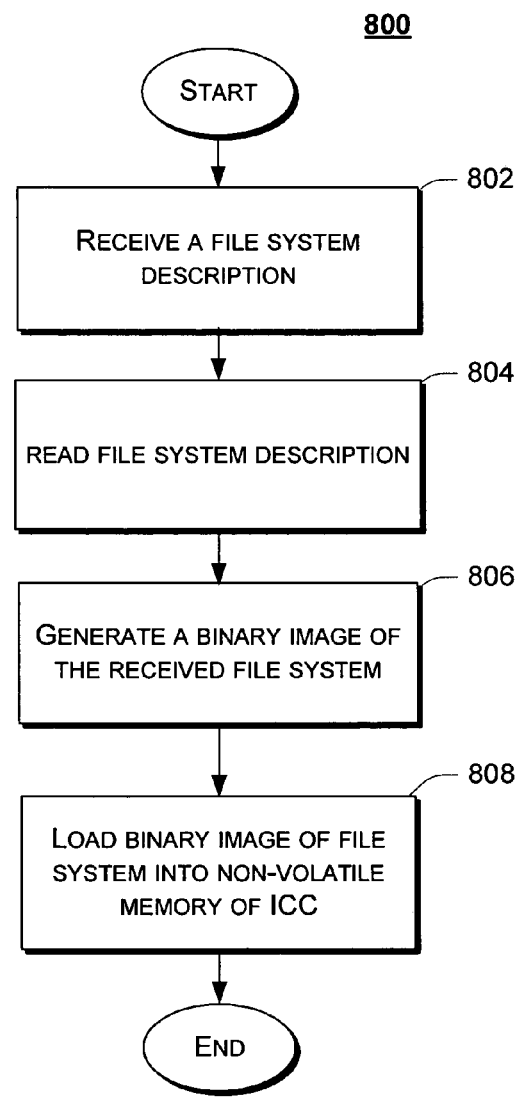
FIG. 8 is a flow chart for building a file system for use on an integrated circuit card, in accordance with the teachings of the present invention.

Turning now to FIG. 8, the operation of the innovative file system builder 410 will be described, according to one aspect of the present invention. As shown, the method begins with step 802, wherein the file system builder 410 receives a file system description. As described above, in accordance with one example embodiment, the file system description is generated by control logic 402 based on received user (developer) input and the ICC file system command set 406 described with reference to Table I.

The received file system description is read, step 804, and a binary image of the file system is created, step 806. As described above, binary image generator 416 reads the ordered series of commands describing the file system, and generates a binary image of the file system to create and implement the file system.

In step 808, the binary image created in step 806 is loaded into the non-volatile memory of a suitable integrated circuit card such as, for example, ICC 208. According to one embodiment of the present invention, the created binary image representation of the file system is loaded into the non-volatile memory 106 of ICC 208 from control logic 402 of development agent 120. In an alternate embodiment, the binary image representation of the file system is stored by control logic 402 in an accessible storage medium, and is masked (burned) into read-only memory (ROM) during the manufacture of ICC 208.

Figure 9:
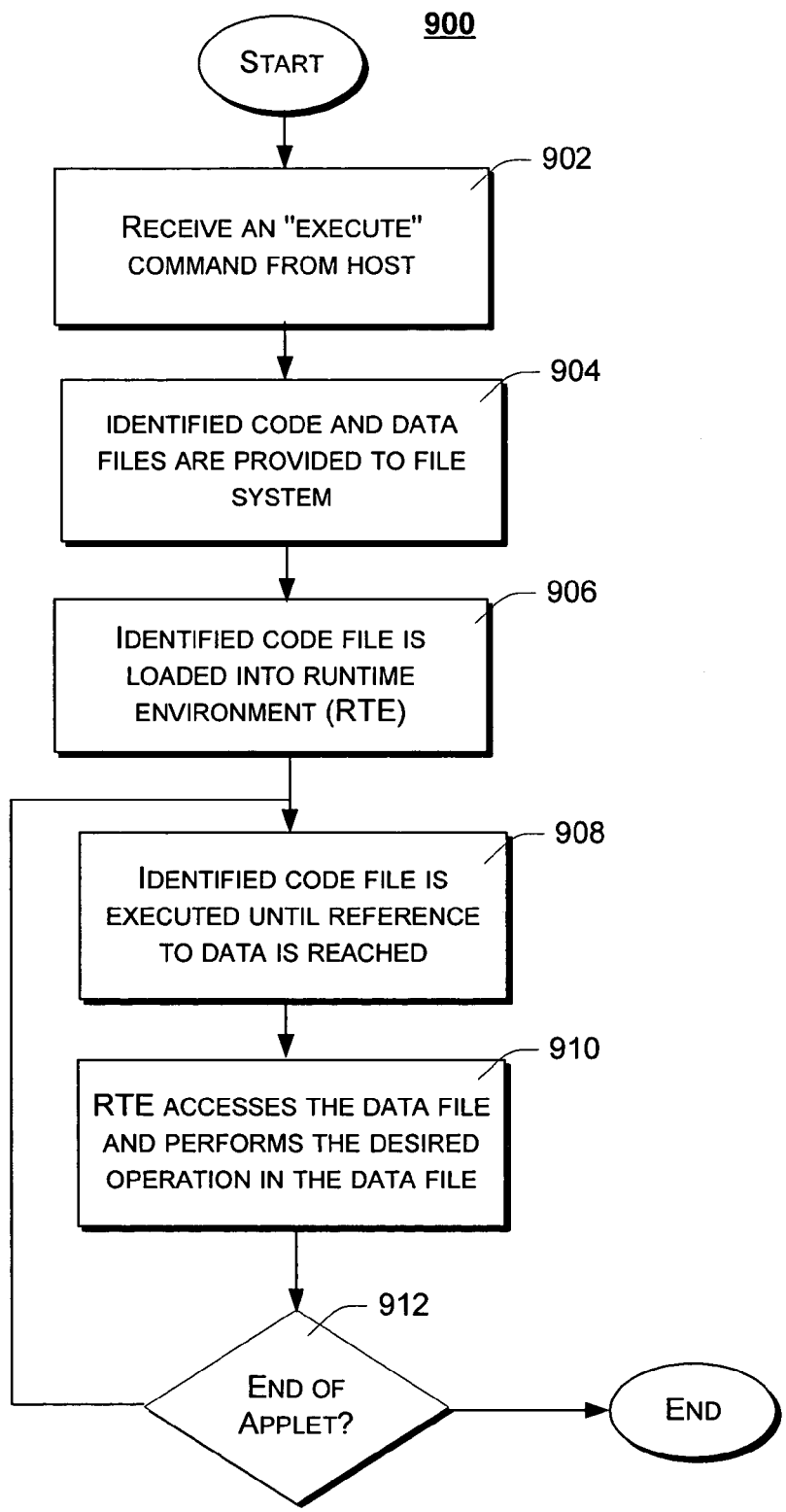
FIG. 9 is a flow chart illustrating the method steps of executing a runtime environment applet on the innovative ICC of FIG. 5, in accordance with the teachings of the present invention.

FIG. 9 is a flow chart illustrating the method steps of executing a runtime environment applet on the innovative ICC of FIG. 5, in accordance with the teachings of the present invention. As shown, the method begins in step 902 when IC card 208 receives a command to invoke a runtime environment applet. More specifically, control logic 502 receives a command in the form EXECUTE (code_filename, data_filename) via I/O port 102, and invokes an instance of runtime environment 214 to execute the applet defined by the identified code file and data file. With reference to FIG. 5, for purposes of illustration, assume that codefile1 and datafile3 are designated. Accordingly, the command EXECUTE (codefile1,datafile3) is received by control logic 502. It should be appreciated, given the scope of the discussion, that any of a number of alternate means may be used to invoke an applet and/or application in accordance with the teachings of the present invention. In one implementation, for example, the activation of the applets (and the selection of the code and data file) can be achieved by an implicit command such as "Execute" or can be explicitly selected by an event through a translation/dispatching table, for example.

In step 904, controller 402 passes the received file names (codefile1,datafile3) to file system 216 to retrieve the files from non-volatile memory 106. In step 906, the identified code file and data file are retrieved and loaded into the runtime environment (RTE) 214, and the identified code file (codefile1) is executed until reference to required data is reached, step 908. In step 910, the RTE accesses the identified data file (datafile3) and performs the desired operation in the data file.

In step 912, a determination of whether the end of the applet has been reached. If, after performing the operation in the data file, the code file has additional executable code, the process continues with step 908 and the bytecode is executed until another reference to a data file operation is reached. If, however, in step 912 the end of the executable code of the identified code file is reached, the applet ends, and any updates to the identified data file (datafile3) are made.

Figure 10:
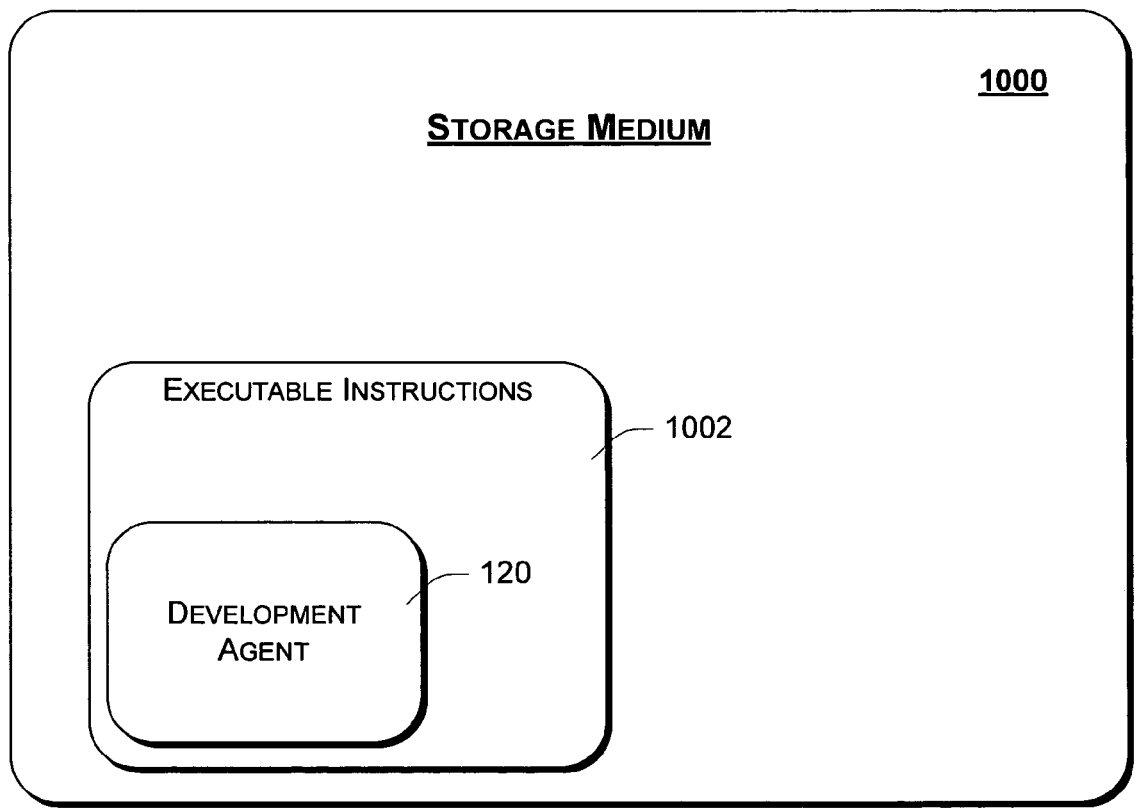
FIG. 10 is a block diagram of an example storage medium having stored thereon a plurality of executable instructions including instructions which, when executed, implement the development agent of the present invention, according to an alternate embodiment of the present invention.

FIG. 10 is a block diagram of an example storage medium having stored thereon a plurality of executable instructions including instructions which, when executed, implement the development agent of the present invention, according to an alternate embodiment of the present invention. In general, FIG. 10 illustrates a storage medium/device 1000 having stored thereon a plurality of instructions 1002 including at least a subset of which that, when executed, implement the innovative features of development agent 120 of the present invention. When executed by a processor of a host system, the executable instructions implementing development agent 120 perform the compiling and file system building functions described above.

As used herein, storage medium 1000 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C, C++, Visual Basic, Java, Smalltalk, Lisp, eXtensible Markup Language (XML), and the like. Moreover, it is to be appreciated that the storage medium/device 1000 need not be co-located with any host system. That is, storage medium/device 1000 may well reside within a remote server communicatively coupled to and accessible by an executing system. Accordingly, the software implementation of FIG. 10 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for compiling a runtime environment applet for an integrated circuit card (ICC), the method comprising:
   receiving source code for the applet;
   translating the received source code to an intermediate level representation;
   separating data objects from the intermediate level representation;
   separating executable bytecode from the intermediate level representation;
   saving the executable bytecode in a discrete code file and saving the data objects in a discrete data file, wherein different discrete code and data files are generated from the respective separating processes, and included in a binary image for use with a transmitted file enumerating their availability for execution on the ICC, the discrete code file and the discrete data file further configured to initialize and configure a runtime environment applet when compiled on the ICC;
   generating the binary image of a file system, including at least the discrete code file and the discrete data file; and
   storing the binary image in non-volatile memory on the ICC, the discrete code file configured to be initiated for execution by a controller on the ICC with different discrete data files stored in non-volatile memory on the ICC to implement different runtime environment applets, and the discrete data file configured to be initiated for execution by the controller on the ICC with different discrete code files stored in non-volatile memory on the ICC to implement the different runtime environment applets.

2. A method as recited in claim 1, wherein receiving the source code and separating the executable bytecode is implemented by an applet compiler of an ICC application development system.

3. A storage medium having stored thereon a plurality of executable instructions which, when executed, implement the method of claim 1.

4. A method for developing a runtime environment applet for execution by an integrated circuit card (ICC), the method comprising:
   receiving source code that is a high-level representation of the applet;
   compiling the received source code into at least a discrete code file and a discrete data file, wherein said compiling comprises:
      translating the received source code to at least an intermediate level representation;
      analyzing the received source code in the at least intermediate level representation;
      parsing executable bytecodes from the at least intermediate level representation;
      parsing data objects from the at least intermediate level representation;
      storing the executable bytecodes in the discrete code file and the data objects in the discrete data file, wherein different discrete code and data files are generated from the respective parsing processes, and included in a binary image for use with a transmitted file enumerating their availability for execution on the ICC, the discrete code file and the discrete data file further configured to initialize and configure a runtime environment applet when compiled on the ICC; and translating the discrete code file and the discrete data file from the intermediate level representation to a lower level language that is executable by control logic of the ICC;

generating the binary image of a file system, including at least the discrete code file and the discrete data file; and storing the binary image in non-volatile memory on the ICC, the discrete code file configured to be initiated for execution by a controller on the ICC with different discrete data files stored in non-volatile memory on the ICC to implement different runtime environment applets, and the discrete data file configured to be initiated for execution by the controller on the ICC with different discrete code files stored in non-volatile memory on the ICC to implement the different runtime environment applets.

5. A method as recited in claim 4, wherein generating the binary image of a file system comprises:

generating an ordered series of commands representing a received file system description;

reading the ordered series of commands; and generating a binary image of the ordered series of commands representing the file system.

6. A method as recited in claim 5, wherein generating the ordered series of commands comprises:

receiving the file system description from a development application in a high-level script form;

accessing a file system command set; and translating the high-level script form of the file system description into the ordered series of commands utilizing the file system command set.

7. A method as recited in claim 4, further comprising loading the generated binary image into the ICC.

8. A method as recited in claim 7, wherein loading comprises downloading the binary image to non-volatile memory of the ICC from a host system using a standard communication protocol.

9. A method as recited in claim 7, wherein loading comprises masking the binary image into a non-volatile memory during a manufacture process of the ICC.

10. A storage medium having stored thereon a plurality of executable instructions which, when executed, implement a method according to claim 4.

11. A storage medium having stored thereon a plurality of executable instructions which, when executed, implement a compiler configured to receive source code for a runtime environment applet in a high-level language from a development tool, the compiler further configured to:

translate the received source code to at least an intermediate level representation;

parse executable bytecodes from the intermediate level representation; and parse data objects from the intermediate level representation store the executable bytecodes in a discrete code file and the data objects in a discrete data file, wherein different discrete code and data files are generated from respective parsing processes, and included in a binary image for use with a transmitted file enumerating their availability for execution on the ICC, the discrete code file and the discrete data file further configured to initialize and configure the runtime environment applet when compiled on the ICC;

generate the binary image of a file system, including at least the discrete code file and the discrete data file; and storing the binary image in non-volatile memory on the ICC, the discrete code file configured to be initiated for execution by a controller on the ICC with different discrete data files stored in non-volatile memory on the ICC to implement different runtime environment applets, and the discrete data file configured to be initiated for execution by the controller on the ICC with different discrete code files stored in non-volatile memory on the ICC to implement the different runtime environment applets.

12. A development system comprising a compiler according to claim 11.

13. A development system comprising:

a storage medium having stored thereon a plurality of executable instructions which, when executed, implement:

an application development tool; and a compiler configured to:

receive source code for a runtime environment applet in a high-level language from the development tool;

translate the received source code to at least an intermediate level representation;

parse executable bytecodes from the intermediate level representation;

parse data objects from the intermediate level representation store the executable bytecodes in a discrete code file and the data objects in a discrete data file, wherein different discrete code and data files are generated from respective parsing processes, and included in a binary image for use with a transmitted file enumerating their availability for execution on the ICC, the discrete code file and the discrete data file further configured to initialize and configure a runtime environment applet when compiled on the ICC;

a file system builder configured to generate the binary image of a file system, including at least the discrete code file and the discrete data file; and storing the binary image in non-volatile memory on the ICC, the discrete code file configured to be initiated for execution by a controller on the ICC with different discrete data files stored in non-volatile memory on the ICC to implement different runtime environment applets, and the discrete data file configured to be initiated for execution by the controller on the ICC with different discrete code files stored in non-volatile memory on the ICC to implement the different runtime environment applets.

* * * * *